United States Patent [19]

Sekigawa et al.

[11] Patent Number: 4,606,050

[45] Date of Patent: Aug. 12, 1986

[54] SYSTEM FOR DETECTING AND RECOVERING A TRANSMITTED SIGNAL

[75] Inventors: Tatsuaki Sekigawa; Akio Gotoh; Syuitsu Tsutsumi, all of Hachioji; Kuniyoshi Marui, Tokorozawa; Naoto Honda, Hino, all of Japan

[73] Assignee: Tokyo Shibaura Denki Kabushiki Kaisha, Kanagawa, Japan

[21] Appl. No.: 516,359

[22] Filed: Jul. 22, 1983

[30] Foreign Application Priority Data

Jul. 30, 1982 [JP] Japan ................................ 57-133568

[51] Int. Cl.⁴ .............................................. H03D 3/18
[52] U.S. Cl. ...................................... 375/75; 375/82; 375/95
[58] Field of Search ...................... 375/75, 80, 82, 94, 375/95, 23; 329/104, 107

[56] References Cited

U.S. PATENT DOCUMENTS 3,656,064  4/1972  Giles et al. ............................ 375/82
4,302,845  11/1981  McClaughry et al. ................ 375/95
4,346,452  8/1982  Groves ................................... 375/87

OTHER PUBLICATIONS

Fuller et al., "Overview of an A.M.P.S. Mobile Call Processing System", 30th Annual IEEE Vehicular Technology Science Conference, Sep. 15-17, 1980.
Norton, "Drop Your Costs, But Not Your Bits With a Manchester-Data Decoder", *Electronic Design*, vol. 27, No. 15, Jul. 19, 1979.

*Primary Examiner*—Joseph A. Orsino, Jr.
*Attorney, Agent, or Firm*—Banner, Birch, McKie & Beckett

[57] ABSTRACT

What is disclosed is a system for recovering encoded data from a transmitted signal. A clock regenerating circuit regenerates a clock signal from the data bits encoded in the signal. The regenerated clock signal is used to synchronize an up/down with each individual data bit. When a data bit is at a logic "H", the counter counts from a predetermined value in an upward direction and when the data bit is at a logic "L", the counter counts in a downward direction from a predetermined value. The count after each bit-time is used to provide a signal representative of the logic state of that data bit. Accordingly, a reproduced data signal can be accurately obtained.

4 Claims, 9 Drawing Figures

SYSTEM FOR DETECTING AND RECOVERING A TRANSMITTED SIGNAL

BACKGROUND OF THE INVENTION

This invention relates generally to the field of data communications, and more particularly, is directed to a system for recovering encoded data from a transmitted signal.

Many data encoding and recovering systems known in the prior art utilize a single data encoding scheme such as Split Phase (SPL). Where there are many systems using the same encoding scheme, however, the likelihood of interference is great. Data communications systems known in the prior art address this problem by utilizing an encoding scheme with a start code comprised of None Return to Zero (NRZ) signals of M bits/sec and a data or information code comprised of SPL signals of M/2 bits/sec where M is a predetermined number of bits. The block diagram of a conventional system for recovering such encoded data is shown in FIG. 1, with associated waveforms shown in FIG. 2. In this conventional system, signal AS (see FIG. 2) represents the encoded data signal and is supplied to clock regenerating circuit 1 and sampling circuit 3. Circuit 1 generates clock signal BS which ideally is an exact replica of the clock signal encoded in the data signal but is delayed by ½ bit time. Regenerated clock signal BS (hereinafter "clock signal BS") is supplied to selecting circuit 2 and frequency divider 5. Frequency divider 5 divides clock signal BS by two (BS/2) and also supplies it to selecting circuit 2. Selecting circuit 2 provides signal CS to sampling circuit 3. Signal CS is either clock signal BS or BS/2, depending on the status of signal ES which is coupled from start code detector 4 to selecting circuit 2. During the start code portion of data signal AS, signal ES disables frequency divider 5 and conditions selecting circuit 2 to output signal CS equal to clock signal BS. See FIG. 2 where the start code portion of data signal AS is represented by time T1 and signal CS is shown as being the same frequency as clock signal BS. The purpose of sampling circuit 3 is to sample the logic state of data signal AS on the rising edge of signal CS. Because clock signal BS, and thus signal CS, is delayed ½ bit time, sampling occurs at the center of each bit in data signal AS. During time T1 (the start code portion of data signal AS as shown in FIG. 2), sampling circuit 3 produces signal DS which is a replica of data signal AS delayed by ½ bit time. The end of the start code portion of data signal AS (end of time T1) is detected by start code detector 4 which changes the logic level of output signal ES. Signal ES thus enables frequency divider 5 and conditions selecting circuit 2 to provide signal CS equal to BS/2 as shown during time T2 in FIG. 2. Time T2 is the actual information or data portion of data signal AS. Clock signal CS is thus equal to clock signal BS during time T1 and clock signal BS/2 during time T2. Signal AS is sampled by sampling circuit 3 using clock signal BS/2 during the time T2 (see FIG. 2). Thus the sampling rate is delayed by ¾ bit time during T2.

As mentioned above, in systems known in the prior art, reproduction of a data signal is done by using a reproduced clock signal whose phase is adequately delayed. The start code part of the signal is sampled at the ½ bit time and the information code portion is sampled at the ¾ bit time. The purpose of sampling at the ½ and ¾ bit time is to improve the signal to noise ratio (S/N) of the system. However, sampling at a single point in each bit does not provide a reliably reproduced signal even though sampled at a delayed bit time. This is especially true for weak signals or signals that are severely interferred with.

SUMMARY OF THE INVENTION

It is one object of this invention to provide a system for recovering encoded data from a signal having NRZ and SPL codes in which highly accurate signal reproduction is possible by using the signal power level of each bit of the codes effectively.

It is another object of the invention to provide a system for recovering encoded data from a signal in which the signal detecting ratio is high and, for example, making it is possible to enlarge the service area of a mobile telephone system.

In this invention, SPL codes, which are used as information codes of the data signal are converted to NRZ (none return to zero) codes by using a circuit which includes an exclusive OR gate. The NRZ codes are used to control a counter which counts the pulses of a high frequency clock. The counter counts from a predetermined value in an upward direction when the logic level of an individual "bit" is at a logic "H" and counts down when the logic level of an individual bit is at a logic "L". At the end of each bit time, a sampling circuit samples the resultant count value. If the value is higher than the predetermined value, a logic "H" is output for that bit. If the value is lower than the predetermined value, a logic "L" is output for that bit. Thus an accurate reproduction of the input signal is obtained.

DESCRIPTION OF THE PREFERRED EMBODIMENTS

Figure 1:
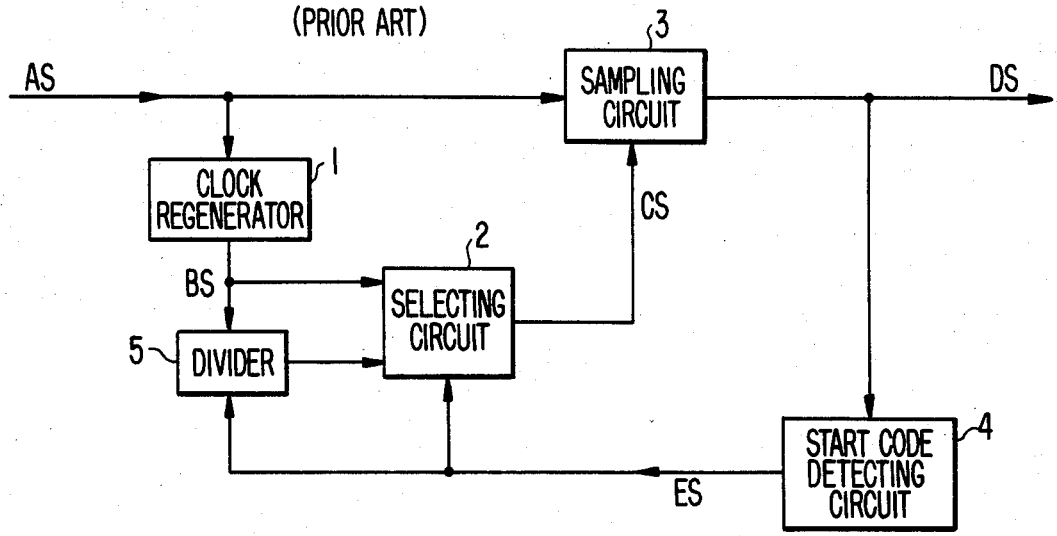
FIG. 1 is a block diagram of a conventional data recovery system known in the prior art.
Figure 2:
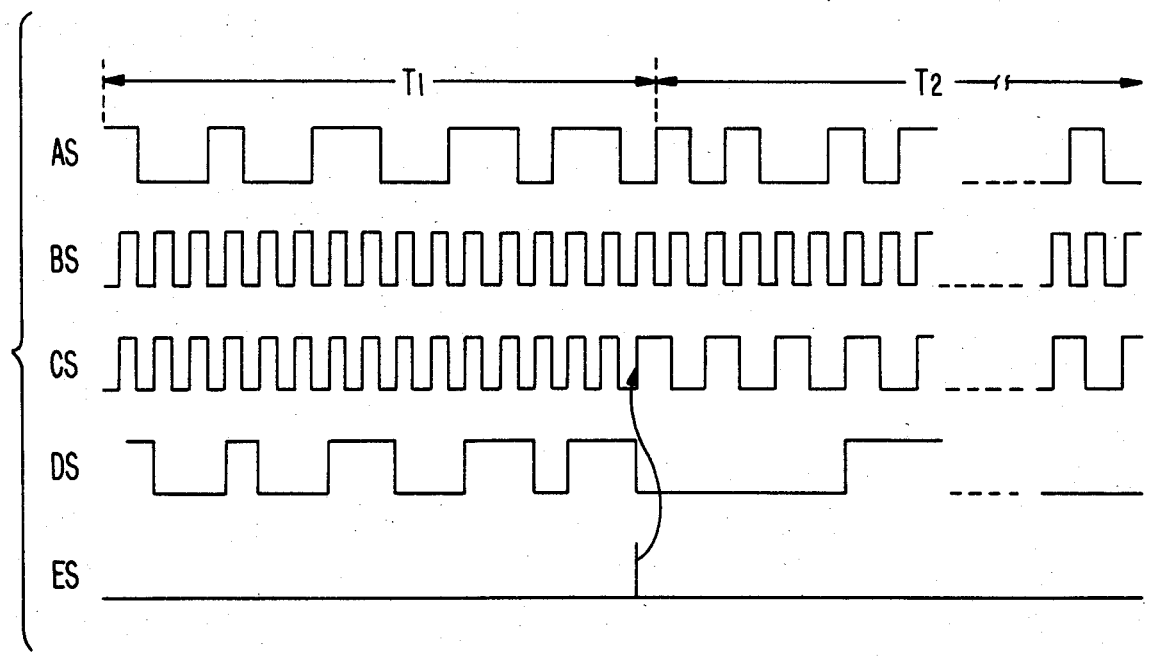
FIG. 2 illustrates waveforms at various points in the circuit shown in FIG. 1.

Referring now to the drawing, the preferred embodiments of the invention will now be described.

Figure 3:
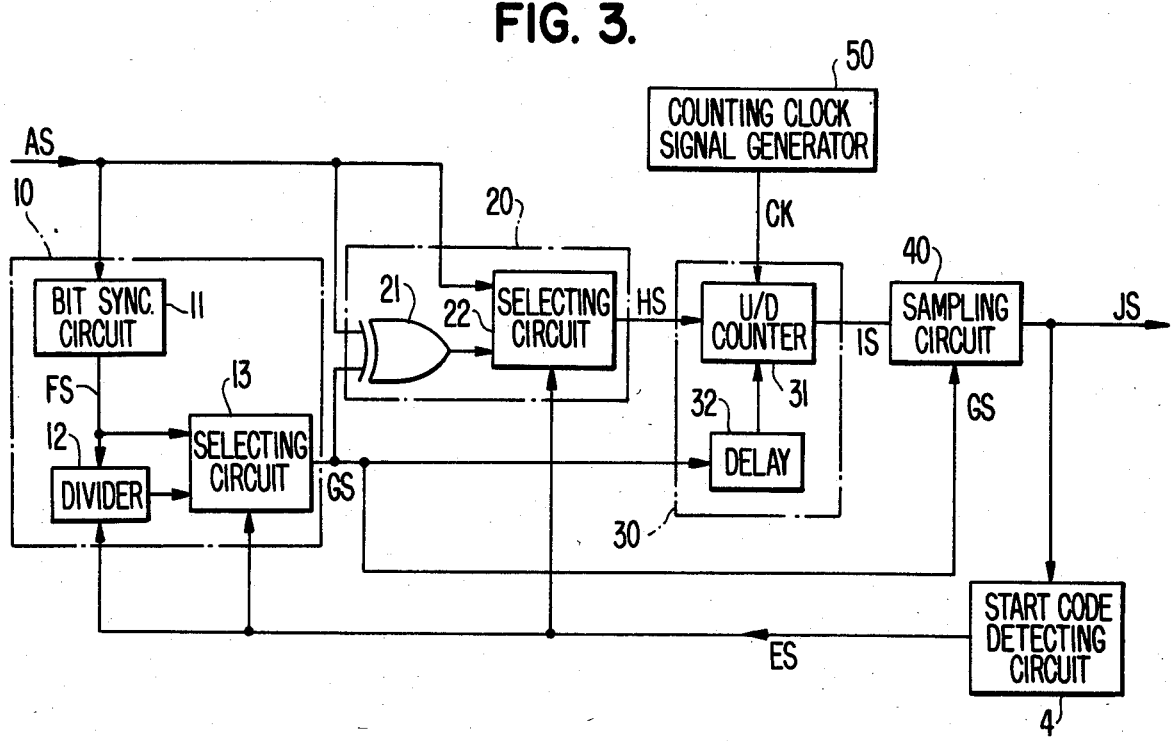
FIG. 3 is a block diagram of one embodiment of the present invention.

FIG. 3 shows a block diagram of one embodiment of the invention which comprises clock signal regenerating circuit 10, code converting circuit 20, counting circuit 30, sampling circuit 40, counting clock signal generating circuit 50, and start code detecting circuit 4. Clock signal regenerating circuit 10 regenerates the clock signal encoded in data signal AS to produce clock signal GS for each start code and information code in signal AS. Converting circuit 20 converts the form of the information codes of signal AS from SPL code to NRZ code to produce signal HS as shown in FIG. 3. Counting circuit 30 is an up/down counter which counts up or counts down the counting clock signal from circuit 50 for the duration of each individual bit of signal HS. Counter 31 counts, for example, in an upward direction when signal HS is at a logic "H" and counts in a downward direction when signal HS is at a logic "L". Sampling circuit 40 samples the count in counting circuit 30 at a sampling time corresponding to the rising edge of regenerated clock signal GS. Counting circuit 30 is initialized to a predetermined value and this value is counted up or counted down for each individual bit of signal HS. When the count value at the end of the bit time is less than the predetermined value, sampling circuit 40 produces, i.e., a logic "L" as signal JS and when the count value is above the predetermined value, sampling circuit 40 produces a logic "H" as signal JS. Thus signal JS is a highly accurate reproductin of signal AS.

Start code detecting circuit 4 detects the end of the start code from reproduced signal JS and outputs signal ES to control the operation of circuits 10 and 20 as explained below.

Figure 4:
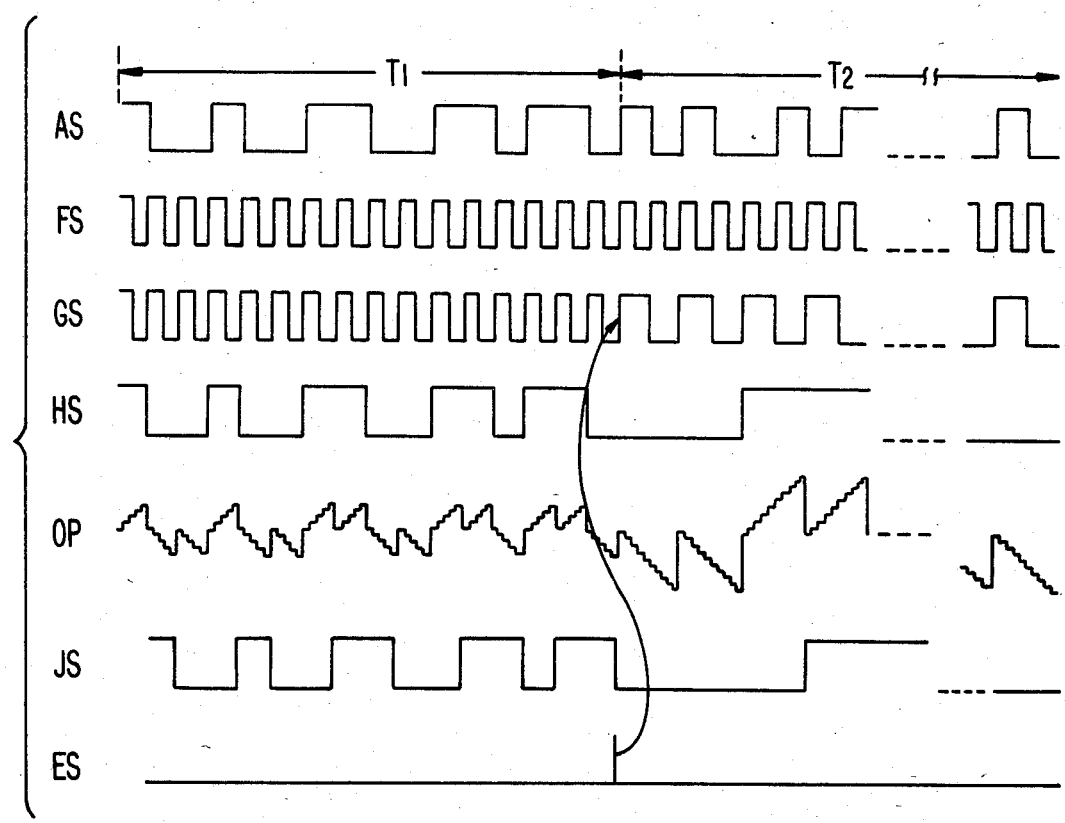
FIG. 4 illustrates waveforms at various points in the circuit shown in FIG. 3.
Figure 5:
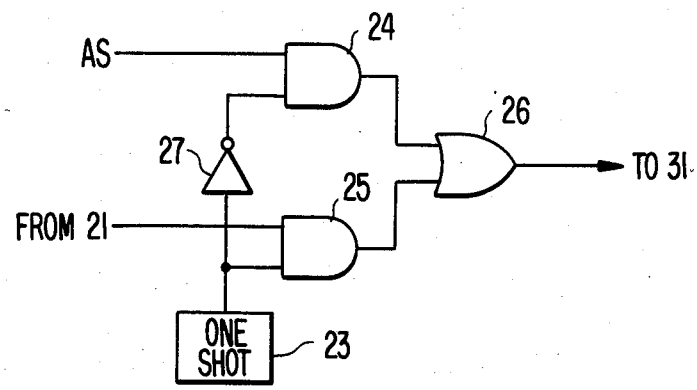
FIG. 5 is a block diagram of selecting circuit 22 as shown in FIG. 3.

Clock signal regenerating circuit 10 comprises bit synchronizing circuit 11, dividing circuit 12 and selecting circuit 13. Bit synchronizing circuit 11 generates clock signal FS according to the bit frequency of the start code of signal AS. Dividing circuit 12 divides the frequency of clock signal FS by two and outputs clock signal FS/2 whose period is twice that of clock signal FS. Selecting circuit 13 outputs clock signal FS during the start code of signal AS (time T1 as shown in FIG. 4) and outputs FS/2 when the end of the start code is detected by start code detector 4 (time T2 as shown in FIG. 4). Converting circuit 20 comprises exclusive OR gate 21 and selecting circuit 22. Exclusive OR gate 21 converts the SPL codes of signal AS to NRZ codes. Selecting circuit 22 comprises one-shot multi-vibrator 23, AND gates 24 and 25, OR gate 26 and invertor 27 as shown in FIG. 5. Vibrator 23 outputs a "H" (high) level signal to establish time period T2. The duration of this signal, and thus the duration of time T2, can be set by adjusting the time constants of the vibrator.

AND gate 25 allows the output signal from exclusive OR circuit 21 to pass only during time T2 which corresponds to the time of the information code. AND gate 24 allows signal AS to pass only at times other than time T2. Accordingly, converting circuit 20 outputs an unmodified signal AS during the time of the starting code (T1) and outputs a signal converted from SPL code to NRZ code during the time of the information code (T2).

Counting circuit 30 comprises up-down counter 31 which has magnitude comparator and delay circuit 32. Circuit 32 delays the timing of signal GS and couples it to up-down counter 31 in order to initialize counter 31 to a predetermined value. The timing is adjusted so that the initialization of counter 31 occurs after sampling by circuit 40. Up-down counter 31 is initialized for each bit of signal HS and is initialized to a value of ½ of the maximum counting range. Up-down counter 31 counts up or counts down counting clock signal CK according to the level of signal HS. For example, it counts up when the level of signal HS is "H", and its counts down when the level of signal HS is "L". At the end of the bit time if the resulting count is higher than the initialization value, the output of the magnitude comparator is an "H" level and if the count is lower than this value, the output of the magnitude comparator is an "L" level. Counting clock CK is generated by counting clock oscillator 50 and is supplied to up-down counter 31. The frequency of clock signal CK is set, for example, 5 times the bit frequency of signal HS. Sampling circuit 40 comprises a D type flip-flop circuit, for example, and it samples output signal IS of counting circuit 30 at the rising edge of clock signal GS and outputs reproduced signal JS.

The operation of this embodiment of the invention will now be described. In the waiting state, selecting circuits 13 and 22 are switched to the states which pass signals FS and AS. In this state, when signal AS is received, regenerated clock signal GS, whose frequency corresponds to the transmitting speed (for example, 600 bit/sec) of the start code, is output from circuit 10 during time T1 (see FIG. 4) of the start code. Signal GS is supplied via delay circuit 32 to up-down counter 31. Signal AS is also supplied via selecting circuit 22 to up-down counter 31 as signal AS. Up-down counter 31 counts up or counts down counting clock signal CK in accordance with the level of signal HS. The contents of counter 31 during a counting sequence is graphically illustrated by waveform OP in FIG. 4. The magnitude comparator of counter 31 outputs an "H" level signal if the value of the counter is above the initialization value and an "L" level if the value of the counter is below the initialization value at the end of the bit time. Output signal IS of counter 31 is sampled by sampling circuit 40 at the rising edge of clock signal GS and reproduced signal JS is output as shown in FIG. 4.

When all bits of the start code are reproduced, start code detecting circuit 4 outputs start code detecting signal ES (see FIG. 4), and selecting circuits 13 and 22 are switched to the other state and dividing circuit 12 is enabled by detecting signal ES. From clock signal regenerating circuit 10, the output signal of dividing circuit 12, whose frequency corresponds to the transmitting speed (for example, 300 bit/sec) of the information code, is output as clock signal GS, i.e., FS/2. The information code of signal AS (during time T2 as shown in FIG. 4) is converted to NRZ code by exclusive ORing this signal with signal GS by exclusive OR circuit 21. Signal HS, as shown in FIG. 4, is output from selecting circuit 22. Thus, up-down counter 31 performs the counting operation in synchronization with clock signal GS (frequency divided signal FS/2) in a similar manner as mentioned above. The contents of counter 31 during the counting sequence is graphically illustrated by waveform OP in FIG. 4. Output signal IS of counter 31, whose level corresponds to whether the count value is above or below the initialization value, is sampled by sampling circuit 40 which is synchronized with signal GS. Thus, reproduced signal JS, as shown in FIG. 4, is output from sampling circuit 40.

As mentioned above, in this embodiment, the counting action is done by up-down counter 31 which counts up or down over the full duration of each signal bit. The cumulative count value over the signal bit is utilized as a sample signal for reproduction of the bit. Thus, the full signal power of each bit is utilized. Accordingly, a highly accurate reproduction of the signal is possible and the detection ratio of signal can be greatly increased. Where this system is applied to a mobile telephone system such as for use in automobiles, its service area can be enlarged so that the cost of its equipment and operation can be reduced. Further, the use of an up-down counter for the counting circuit is simpler than using a plurality of counters.

Figure 6:
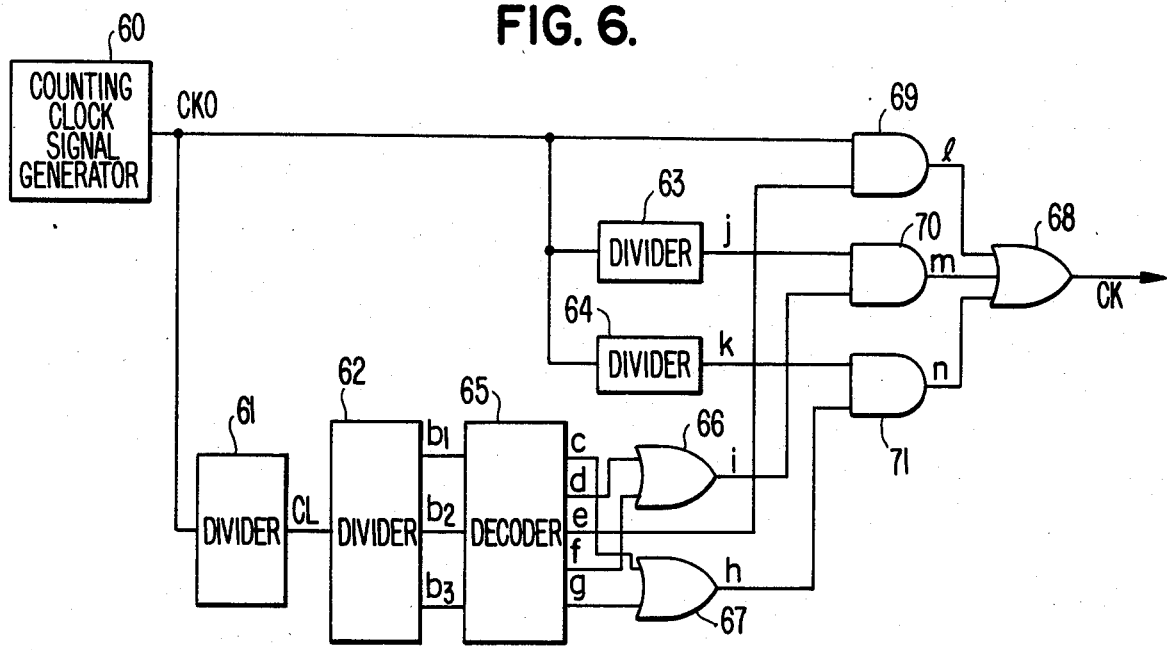
FIG. 6 is a block diagram of one embodiment of counting clock signal generating circuit 50 as shown in FIG. 3.
Figure 7:
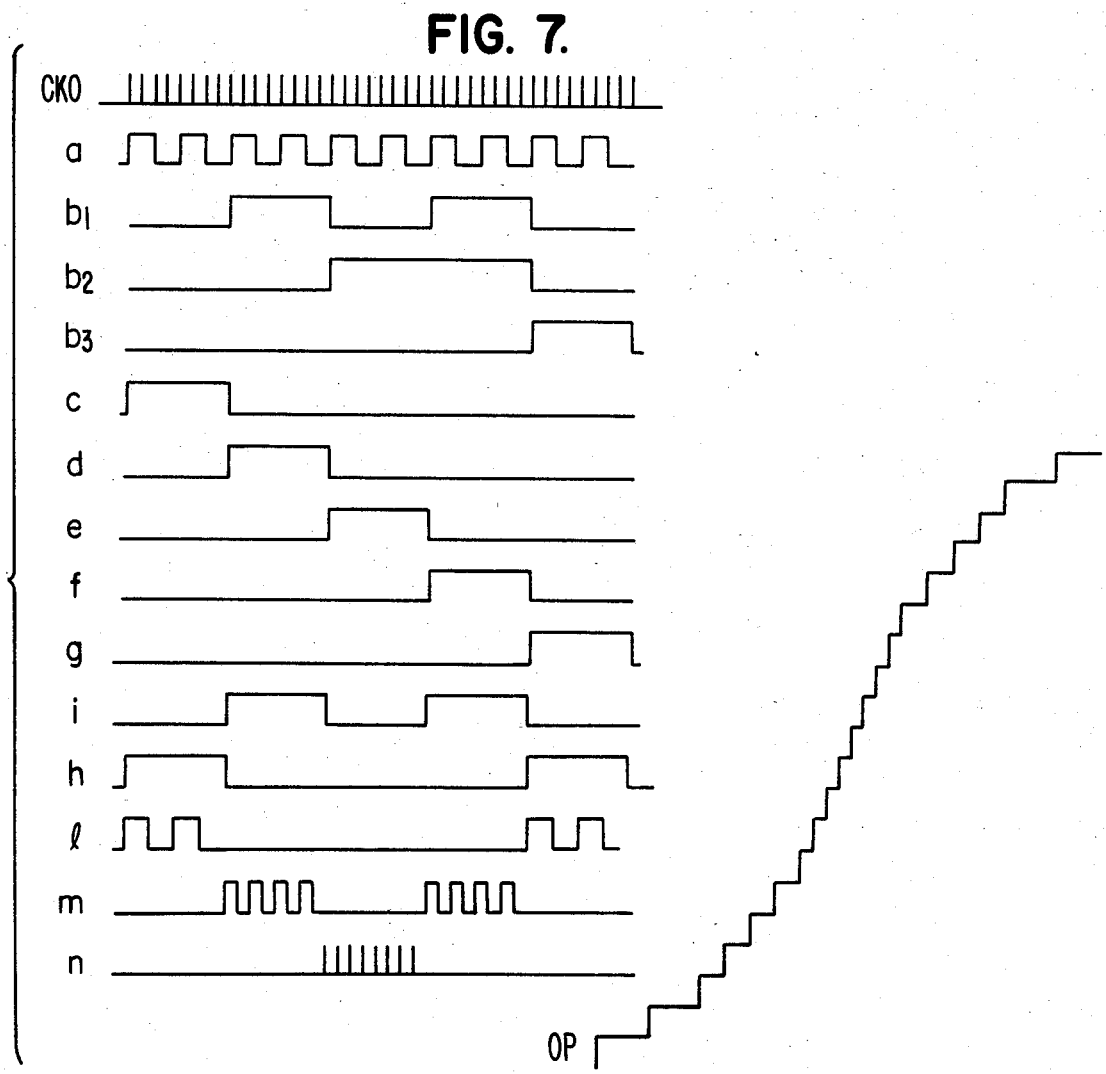
FIG. 7 illustrates waveforms at various points in the circuit shown in FIG. 6.

Further, this invention is not limited to the above-mentioned embodiment. For example, in the above embodiment, the frequency of high frequency clock signal CK is constant. However, it is possible to vary its frequency in each bit so that the frequency is higher in the area where the signal power is large. In this embodiment, maximum frequency counting is done in the area of the bit where the signal power is large and S/N ratio is high (generally, the middle part of each bit). By using this method, the detecting ratio is significantly increased. A circuit generating a variable high frequency clock is comprised of counting clock signal generator 60, dividing circuits 61, 62, 63, and 64, OR gates 66, 67, 68 and AND gates 69, 70 and 71, as shown in FIG. 6. This circuit will now be described with reference to FIG. 7.

The frequency of counting clock signal CKO from generator 60 is divided by 4 by circuit 61. This frequency divided signal is supplied to divide-by-5 circuit 62 to generate signals b1, b2 and b3. Decoder 65 logically combines signals b1, b2 and b3 to generate output signals c, d, e, f and g. OR circuit 66 outputs signal i by ORing signals d and f. OR circuit 67 outputs signal h by ORing signal c and d. Signals i, h and e are supplied to AND circuits 70, 71 and 69. Thus, signal i selects divided-by-2 signal j, signal h selects divided-by-4 signal k and signal e selects original counting clock CKO. Selected signals l, m and n, i.e., the output signals of AND circuit 69, 70 and 71, are supplied to OR circuit 68. The the output signal of OR circuit 68 is input signal CK to up-down counter 31. By using this signal, the counting content OP of the up-down counter is weighted at the area where signal power is large as shown as FIG. 7.

Figure 8:
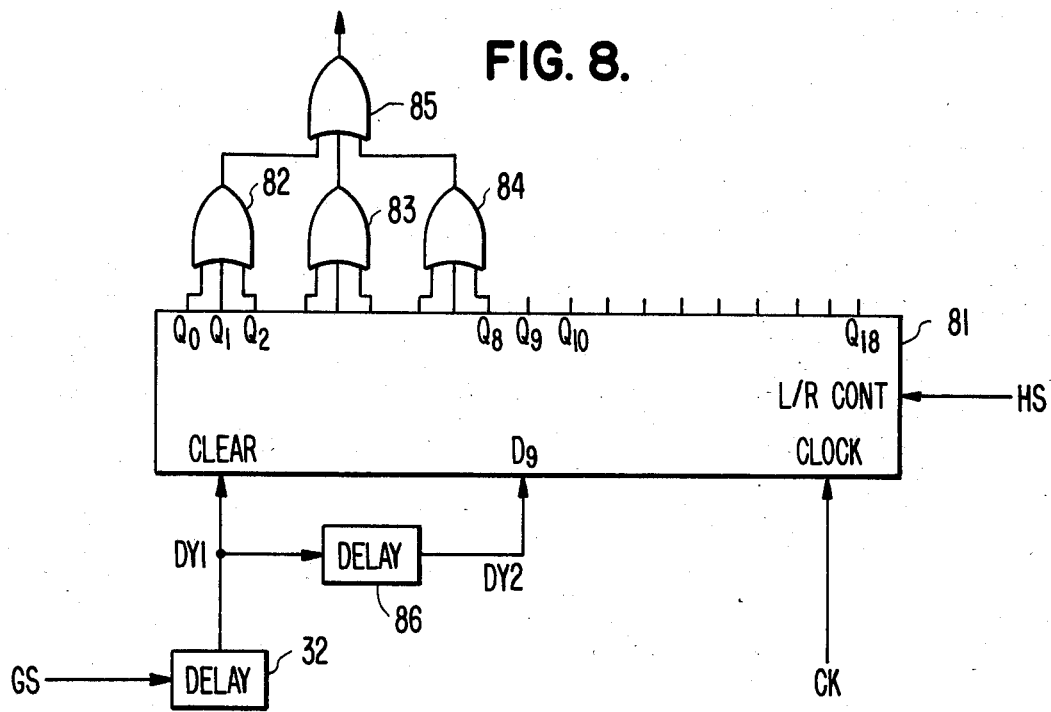
FIG. 8 is a block diagram of one embodiment of counting circuit 30 as shown in FIG. 3.
Figure 9:
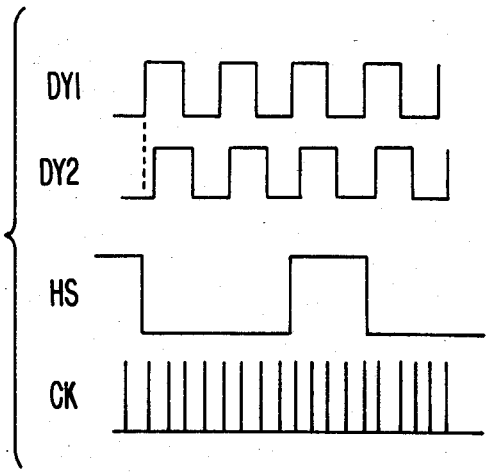
FIG. 9 illustrates waveforms at various points in the circuit shown in FIG. 8.

Further, in the above-mentioned embodiment, an up-down counter is used as the counting circuit. However, a bi-directional shift register may be used instead of up-down counter 31. In this case, as shown in FIG. 8, bi-directional shift register 81, OR circuit 82, 83, 84, 85 and delay circuit 86 are used instead of up-down counter 31. In this embodiment, the shift register content is shifted to the right or to left according to the control input signal HS coupled to control terminal L/R CONT. Referring to FIG. 9, bi-directional shift register 81 is cleared by the rising edge of the output signal of delay circuit 32 so that its content is set to all "0s". The middle bit (for example, 10th bit if the number of bits is 19), is then set to a logic "1" by the rising edge of the output signal from delay circuit 86, which is more delayed than the rising edge of the output signal of delay circuit 32. Then the set "1" is shifted to the right or to the left by counting clock signal CK depending on the level of signal HS supplied to the terminal L/R CONT. When the level of signal HS is "H", the content is shifted to the left. When the level of signal HS is "L", the content is shifted to the right. In this case, it can be considered that a shift to the right corresponds to an up count and a shift to the left corresponds to a down count. The contents of the shift register is graphically the same as the content of up/down counter 31 as shown by waveform OP shown in FIG. 4. The ORed output IS of the outputs of left half bits Q0-Q8 is the output of the counting circuit.

Further, instead of up-down counter 31, two counters or two shift registers may be used, each of them performing the counting action for each level of signal HS.

Furthermore, concerning the clock signal regenerating circuit 10, converting circuit 20 or sampling circuit 40, several different logic variations are possible. What is shown is a representative of the many logic circuits which may be combined to perform the same action. A micro-processor could also be used.

Since obvious changes may be made in the illustrated embodiment of the system without departing from the scope of the invention, it is intended that all matter contained herein be interpreted as illustrative and not in a limiting sense.

We claim:

1. A system for detecting and recovering the information encoded in a data signal having NRZ start codes and SPL information codes, wherein said NRZ start codes and said SPL information codes include a plurality of information bits, a portion of each of said bits having a determinable signal power, said system comprising:

start code detecting means for detecting the ends of said NRZ start codes and providing start code signals accordingly;

clock signal regenerating means responsive to said start code signals for receiving said data signal and regenerating a clock signal from said information bits;

converting means connected to said clock signal regenerating means and responsive to said start code signals for receiving said data signal and converting said SPL information codes to NRZ information codes;

counting clock signal generating means for generating a counting clock signal having a frequency higher than the frequency of said information bits;

selection means for selecting the plurality of information bits of one of said codes;

counting means connected to said clock signal generating means for counting said counting clock signal in a first direction when the level of the information bit selected by said selection means is at a predetermined first level and in a second direction when the information bit selected by said selection means is at a predetermined second level to produce a counting result, said counting means counting in said first and second direction at the same rate; and signal reproducing means for reproducing said data signal according to said counting result of said counting means.

2. A system for detecting and recovering the information encoded in a data signal according to claim 1 wherein said counting clock signal generating means generates a counting signal whose frequency is dependent on the signal power level of each portion of each bit of said signal.

3. A system for detecting and recovering the information encoded in a data signal according to claim 1 wherein said counting means is an up-down counter which counts up said clock counting signal when the level of a selected said information bit is a logic "H" and counts down said clock counting signal when the level of a selected said information bit is a logic "L".

4. A system for detecting and recovering the information encoded in a data signal according to claim 1 wherein said counting means is a bi-directional shift register which shifts to the right in response to said counting signal when the level of a selected said information bit is a logic "H" and shifts to the left when a said selected information bit is a logic "L".

* * * * *